(12) United States Patent
Kitano et al.

(10) Patent No.: US 6,830,647 B2
(45) Date of Patent: Dec. 14, 2004

(54) METHOD FOR LAMINATING DISC-SHAPED SUBSTRATES

(75) Inventors: Ryoko Kitano, Tokushima-ken (JP); Masami Inouchi, Tokushima-ken (JP)

(73) Assignee: Kitano Engineering Co., Ltd., Tokushima-ken (JP)

( * ) Notice: Subject to any disclaimer, the term of this patent is extended or adjusted under 35 U.S.C. 154(b) by 139 days.

(21) Appl. No.: 09/892,466

(22) Filed: Jun. 28, 2001

(65) Prior Publication Data

US 2002/0000297 A1 Jan. 3, 2002

(30) Foreign Application Priority Data

Jun. 29, 2000 (JP) ........................................ 2000-197370

(51) Int. Cl.[7] .................................................. G11B 7/26
(52) U.S. Cl. ........................................ 156/312; 156/286
(58) Field of Search ............................. 156/312, 295, 156/286, 306.6

(56) References Cited

U.S. PATENT DOCUMENTS 6,004,420 A * 12/1999 Nakamura et al. ........... 156/249
6,066,218 A * 5/2000 Kuhn et al. .................... 156/87
6,168,682 B1 * 1/2001 Bennett et al. ............... 156/295

FOREIGN PATENT DOCUMENTS

| EP | 330197 A2 * | 8/1989 | ............ G11B/7/24 |
| EP | 0 854 477 A1 | 7/1998 | |
| GB | 0855703 A2 * | 7/1998 | ............ G11B/7/26 |

OTHER PUBLICATIONS

Patent Abstracts of Japan, vol. 013, No. 138 (P–852), Apr. 6, 1989 (corresponding to JP 63 304444 A).

* cited by examiner

Primary Examiner—Blaine Copenheaver
Assistant Examiner—John T. Haran
(74) Attorney, Agent, or Firm—Sughrue Mion, PLLC

(57) ABSTRACT

A high quality optical disc with extremely tiny bubbles or bubble less present in both disc-shaped substrates when they are laminated by means of an adhesive sheet in a operation process. The method includes bonding the adhesive agent to the surface of the lower disc-shaped substrate placing the upper disc-shaped substrate on the adhesive applied to lower disc-shaped substrate, pressurizing the upper disc-shaped substrate against the lower disc-shaped substrate by means of the pressing body, and exposing both the disk-shaped substrates to a high-pressure atmosphere. In a next operation process in which both the disc-shaped substrates are left to the inside of a high pressure atmosphere, firstly pressing body is permitted to press against the disc-shaped substrates to so enlarge or magnify the contact portion from the center side to the outside to render high-pressure atmospheric.

5 Claims, 13 Drawing Sheets

FIG.1

STEP1 — BONDING AN ADHESIVE AGENT TO THE SURFACE OF A LOWER DISC- SHAPED SUBSTRATE

⇩

STEP2 — PLACING AN UPPER DISC-SHAPED SUBSTRATE ON THE LOWER DISC-SHAPED SUBSTRATE WITH THE ADHESIVE AGENT BONDED THERETO

⇩

STEP3 — AN UPPER DISC-SHAPED SUBSTRATE IS PRESSED AGAINST THE LOWER DISC-SHAPED SUBSTRATE BY MEANS A PRESSURE MEMBER

⇩

STEP4 — LEAVING BOTH THE DISC-SHAPED SUBSTRATES WITHIN A HIGH-PRESSURE ATMOSPHERE

FIG.11 (A)
FIG.11 (B)
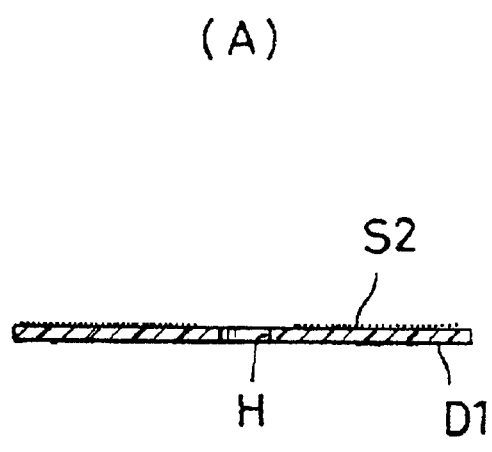
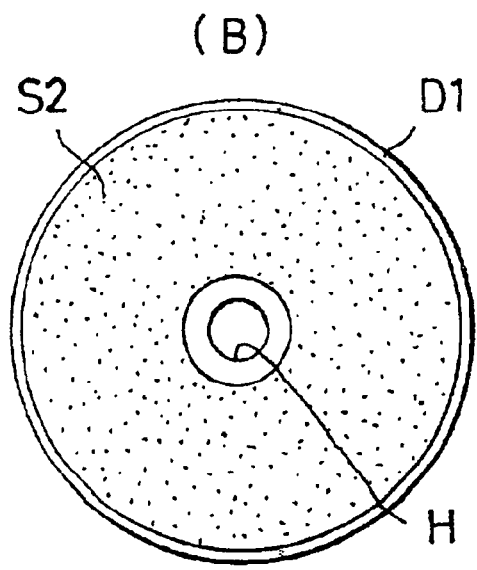

(A)

(B)

METHOD FOR LAMINATING DISC-SHAPED SUBSTRATES

BACKGROUND OF THE INVENTION

1. Field of the Invention

The present invention relates to a method for laminating disc-shaped substrates, more particularly to such a method of integrally laminating two disc-shaped substrates using an adhesive sheet, and more specifically to such a method for laminating both the two disc-shaped substrates together as a unit.

2. Prior Art

In recent years, computers, especially personal computers have remarkably popularized on one hand, the capacity of storage mediums to be used therein, especially, the capacity of a storage disc has been highly densified more and more and types thereof have been also increased accompanied thereby on the other hand.

There are a magnetic disc-shaped, an optical disc (e.g., CD-ROM), an optical disc (e.g., MO), etc. as the storage disc. Among others, the demand for the optical disc has been increased recently.

Take, for example, an optical disc so called "DVD", a disc-shaped substrate in the form of single plate which constitutes it is standardized as a thickness of 0.6 mm, an outer diameter of 120 mm, and an inner diameter 15 mm in its central hole.

Since such a thin disc-shaped substrate formed of a single plate is low in mechanical strength and is easily deformable, and in view of storage capacity, the disc-shaped substrates each of the same thickness (0.6 mm) are bonded onto each other to form an integrated substrate in a practical use thereof.

Such a high density storage disc-shaped (i.e. a DVD) is generally used as a ply-plate structure as set forth above, but is not used as a single plate. In such a case, it is necessary that both the upper and lower disc-shaped substrates to be bonded onto each other.

For manufacturing an integrated optical disc by bonding two single plates, there is provided a method of integrally laminating the two single plates by use of an adhesive agent.

According to such method, UV cured resin as the adhesive agent is coated to the lower disc-shaped substrate in the form of a doughnut, with the upper disc-shaped substrate being placed thereupon to rotate both the disc-shaped substrates to thereby develop or draw the UV cured resin.

After such development or orientation, irradiation of UV is applied to cure UV cured resin interposed between both the disc-shaped substrates together as a unit.

However, such method relies on development or orientation by means of rotation so that, not only UV cured resin may be scattered outwardly to have the periphery thereof dirty or contaminated but also the resin may be dispersed to lessen effective usage to afford a lesser yield rate of UV cured resin.

A step or the like of irradiating UV for curing the adhesive agent is required to thus increase manufacturing processes thus increasing manufacturing cost.

Under such circumstances, a new laminating method with use of the adhesive agent, which requires no development or orientation process of the adhesive agent.

According to a new and useful method, an adhesive sheet member is employed instead of UV cured resin (adhesive agent).

More specifically, this is such a method that the adhesive agent as an adhesive sheet member is bonded to the lower disc-shaped substrate, with the upper disc-shaped substrate being overlaid thereon, and that these disc-shaped substrates are pressurized by a pressing body from above to integrate them as a unit.

Notwithstanding, due to the fact that the adhesive agent tends to instantaneously adhere to both the disc-shaped substrates, air bubbles are readily entered between the adhesive agent and the disc-shaped substrates when the adhesive sheet is pressed against the surface of the lower disc-shaped substrate. This is the also the case where the upper disc-shaped substrate is laid on the lower disc-shaped substrate to which the adhesive agent adheres. As a result, the optical disc with air bubbles may be inevitably manufactured to thus impede or deteriorate the quality.

SUMMARY OF THE INVENTION

The present invention has been provided to solve the foregoing problem. In other words, it is an object of the invention to provide a method for laminating disc-shaped substrates between which there is extremely lesser bubbles or without any bubble.

As a result of a concentrate study to solve the aforementioned problem, there has been an awareness that once both the laminated disc-shaped substrates are left to or exposed to a high-pressure atmosphere to afford volume reduction thereby leading to a new and useful invention.

Stated otherwise, a first aspect of the invention resides in a method for laminating disc-shaped substrates wherein both the disc-shaped substrates has been left to high-pressure atmosphere for a given time after the substrates have been laminated by an adhesive agent.

A second aspect of the invention resides in a method of laminating disc-shaped substrates wherein an upper disc-shaped is pressed against a lower disc-shaped substrate by a pressing body simultaneously with leaving the same to the high-pressure atmosphere.

A third aspect of the invention resides in a method of laminating disc-shaped substrates comprising the following sequential four steps of;

1) bonding the adhesive agent to the surface of the lower disc-shaped substrate,
2) placing the upper disc-shaped substrate on the adhesive applied to low disc-shaped substrate,
3) pressurizing the upper disc-shaped substrate against the lower disc-shaped substrate by means of the pressing body, and
4) exposing both the disk-shaped substrates to a high-pressure atmosphere.

A fourth aspect of the invention resides in the method wherein the adhesive agent is bonded to the surface of the lower disc-shaped substrate, and wherein the step is taken to bond the adhesive agent to the surface of the lower disc-shaped substrate in such a manner that the adhesive-backed sheet is pressed against the substrate from one end to the other end.

A fifth aspect of the invention resides in the method wherein the step of 3) in the third aspect of the invention is performed in a state where the upper disc-shaped substrate is pressurized against the lower disc-shaped substrate by means of the pressing body in a state whereas the pressing body is held against in such a manner that a contact portion may be magnified from the center side to the outside.

A sixth aspect of the invention resides in the method wherein firstly the pressing body in the step of (4) is held against the upper disc-shaped substrate in such a manner that a contact portion may be magnified from the center side to the outside, A seventh aspect of the invention resides in the method wherein hold down pressure not only in the step (1) but also in the step (3) in the third aspect of the invention is applied to magnify high-pressure.

With the employment of the method of laminating disc-shaped substrates according to the first to the seventh aspect of the invention, each of air bubbles may be of smaller size to obtain high quality optical disc.

BRIEF DESCRIPTION OF THE DRAWINGS

FIG. 1 is a block diagram showing steps in the method of laminating disc-shaped substrates according to the present invention;

FIG. 11A is a sectional view of the lower disc-shaped substrate the surface of which adhesive agent is applied to;

FIG. 11B is a side view of the lower disc-shaped substrate the surface of which adhesive agent is applied to;

PREFERRED EMBODIMENT OF THE INVENTION

A method of laminating disc-shaped substrates according to the present invention will be now described with reference to FIGS. 1 through 13.

A method of laminating disc-shaped substrates according to the present invention is characterized in that two disc-shaped substrates are bonded together by an adhesive agent to leave or expose them to the high-pressure atmosphere for a certain time.

For the purpose of further explanation of process steps of lamination of the disc-shaped substrates, wherein each of the steps may be illustrated in a block diagram of FIG. 1. Namely, for laminating two disc-shaped substrates, the following steps are taken;

1) bonding the adhesive agent to the surface of the lower disc-shaped placing the upper disc-shaped substrate on the adhesive applied lower disc-shaped substrate,
2) placing the upper disc-shaped substrate on the adhesive applied lower disc-shaped substrate,
3) pressurizing the upper disc-shaped substrate against the lower disc-shaped substrate by means of the pressing body, and
4) exposing both the disk-shaped substrates to a high-pressure atmosphere.

FIGS. 2 through 5 are views showing how to laminate the disc-shaped substrates through the method according the present invention.

Initially, the lower disc-shaped substrate D1 is held in such a state where it is laid on a holding table 2.

Figure 2:
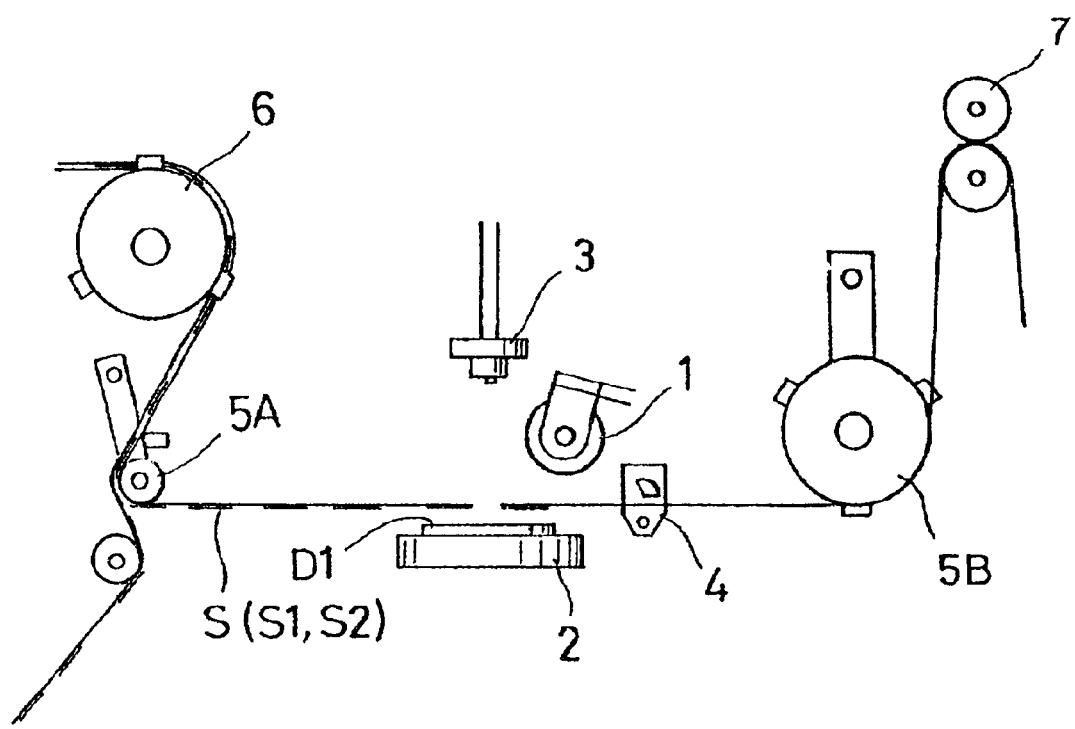
FIG. 2 is a view showing how to bond an adhesive agent (in the initial state)

As shown in FIG. 2, an adhesive sheet body S is supported between each of tension rollers 5A and tension rollers 5B disposed upstream and downstream the holding table 2 and a laminating roller 1 under condition where a sheet like adhesive agent S2 in the form of a doughnut is downwardly exposed underneath of the sheet body S.

A pitch feed roller 6 and a take-up roller 7 are arranged forwardly and outwardly of rollers 5A and 5B.

Figure 3:
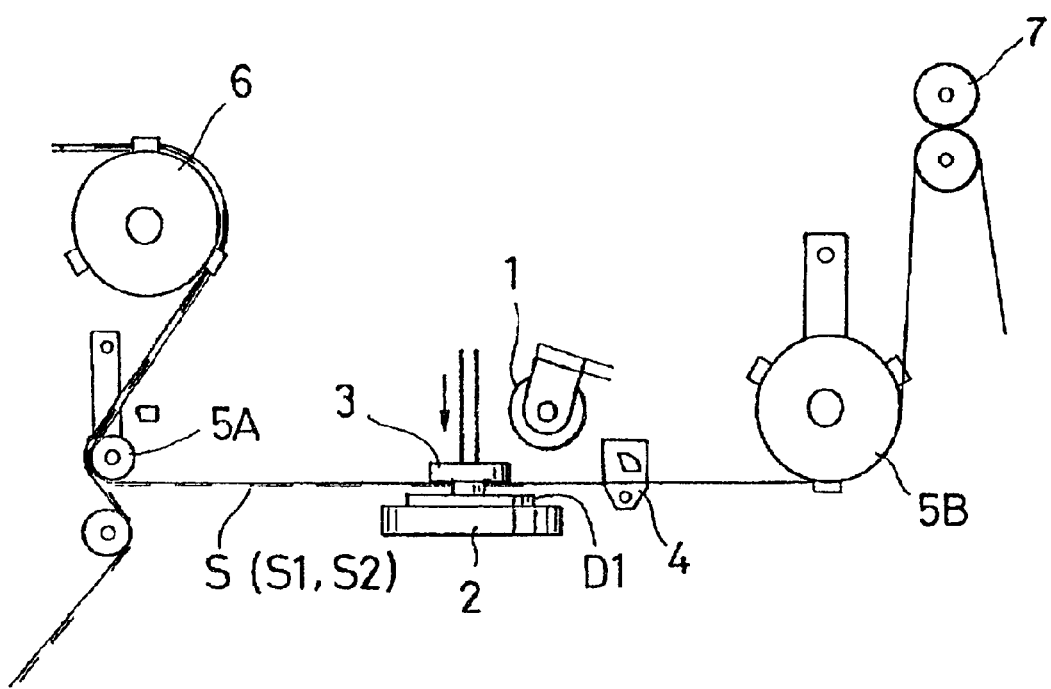
FIG. 3 is a view showing how to bond an adhesive agent (when positioned)

As illustrated in FIG. 3, a centering shaft 3 as a positioning member is lowered to position the adhesive sheet body S with respect to the lower disc-shaped substrate D1 for the adhesive sheet body S.

At this moment, suction is made in a small hole (not shown) perforated through the holding table 2 so that the lower disc-shaped substrate D1 may be sucked and held so as not to move as it is positioned on the holding table 2.

Figure 4:
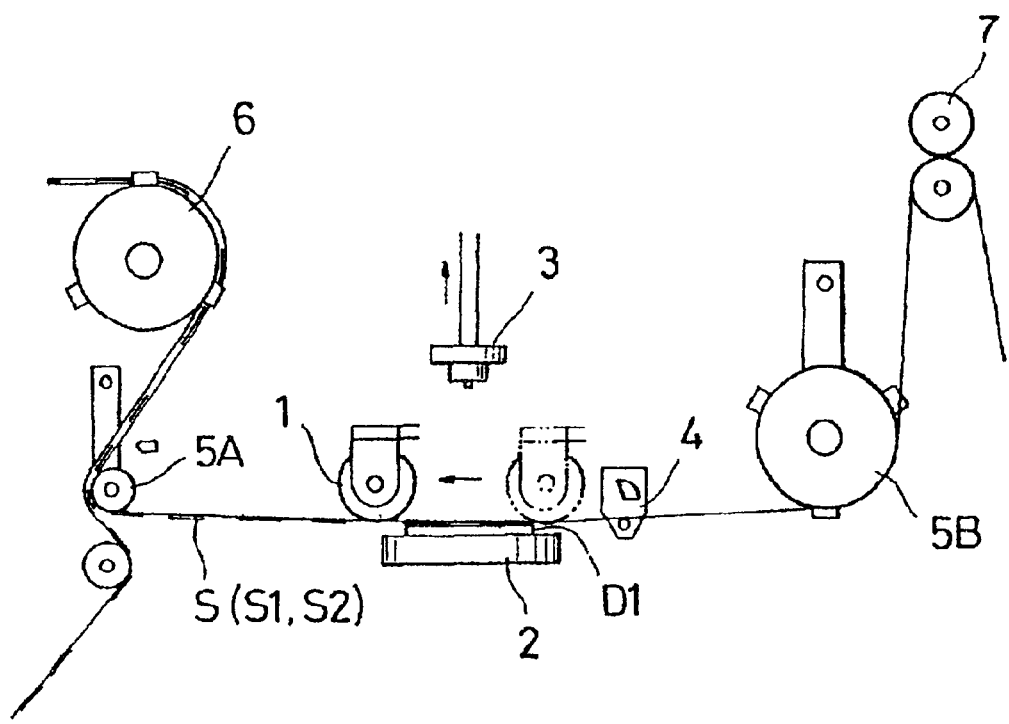
FIG. 4 is a view showing how to bond an adhesive agent (when a pressure roller is held down)
Figure 5:
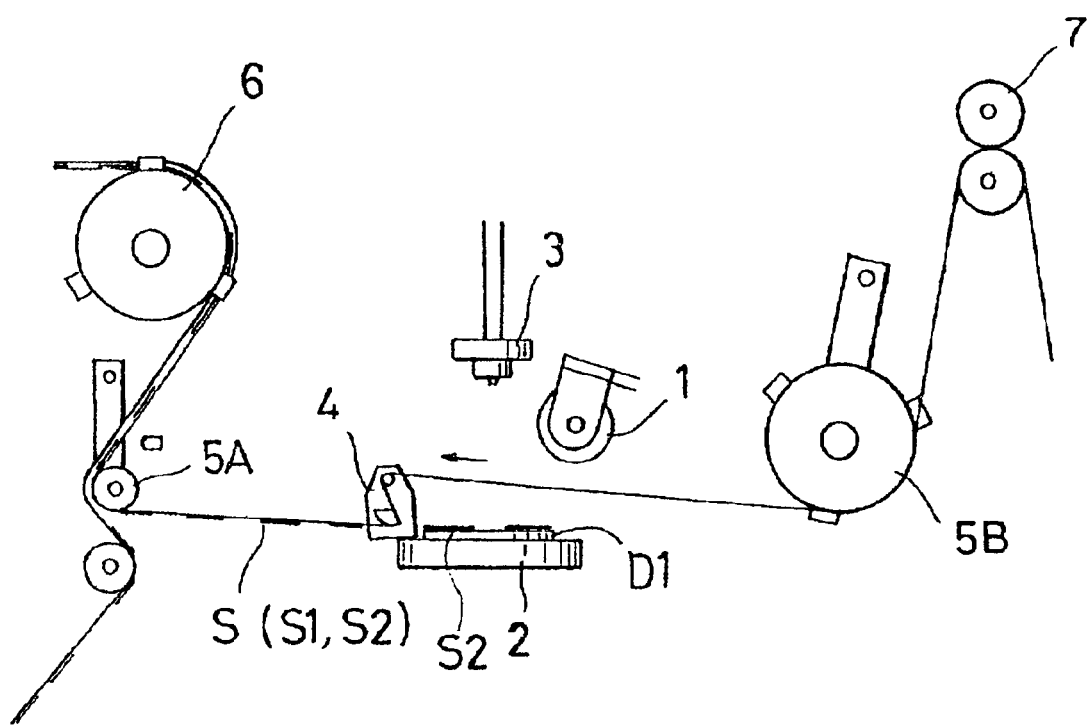
FIG. 5 is a view showing how to bond an adhesive agent (when a release member provides traversal movement)

A pressure roller 1 as a hold down member (as shown in FIG. 4) is rolled upwardly over the lower disc-shaped substrate D1 (more specifically, over the adhesive sheet S on the lower disc-shaped substrate) in the direction of an arrow in FIG. 4.

In this connection, it is noted that the centering shaft 3 is move upwardly in the phase where rolling motion is initiated) and is kept away therefrom.

By rolling action of the pressure roller, the adhesive sheet member S is pressed against the lower disc-shaped substrate D1 to press the adhesive sheet member S against thereby sticking it to all over the surface of the lower disc-shaped substrate D1.

Pressure derived from the pressure roller when rolled may be enough to provide contact pressure (normally, 2 3 atmospheres or so) to the extent that the adhesive sheet member may be stuck to the surface of the lower disc-shaped substrate.

Release member (FIG. 5) as means for peeling off, which is disposed downstream of the holding table 2 is quickly so moved as to traverse between the adhesive sheet S and the lower disc-shaped disc substrate D1 laid on the holding table.

The surface of the lower disc-shaped disc substrate D1 is peeled from the adhesive sheet member S (more particularly, a carrier S1).

The adhesive sheet member S is peeled from the lower disc-shaped disc substrate D1 (more specifically, an adhesive agent S2 on the lower disc-shaped disc substrate) to make free therefrom at the time when the release member 4 have completed to traverse the holding table D1.

In this manner, the adhesive sheet member S (more particularly, carrier 1) is peeled off from the lower disc-shaped disc substrate D1 to then afford the state where the adhesive agent S2 is applied to outwardly of the upper disc-shaped substrate (see FIG. 11).

Now, a turn table on which the holding table 2 is mounted is instantaneously moved to the next station.

Figure 6:
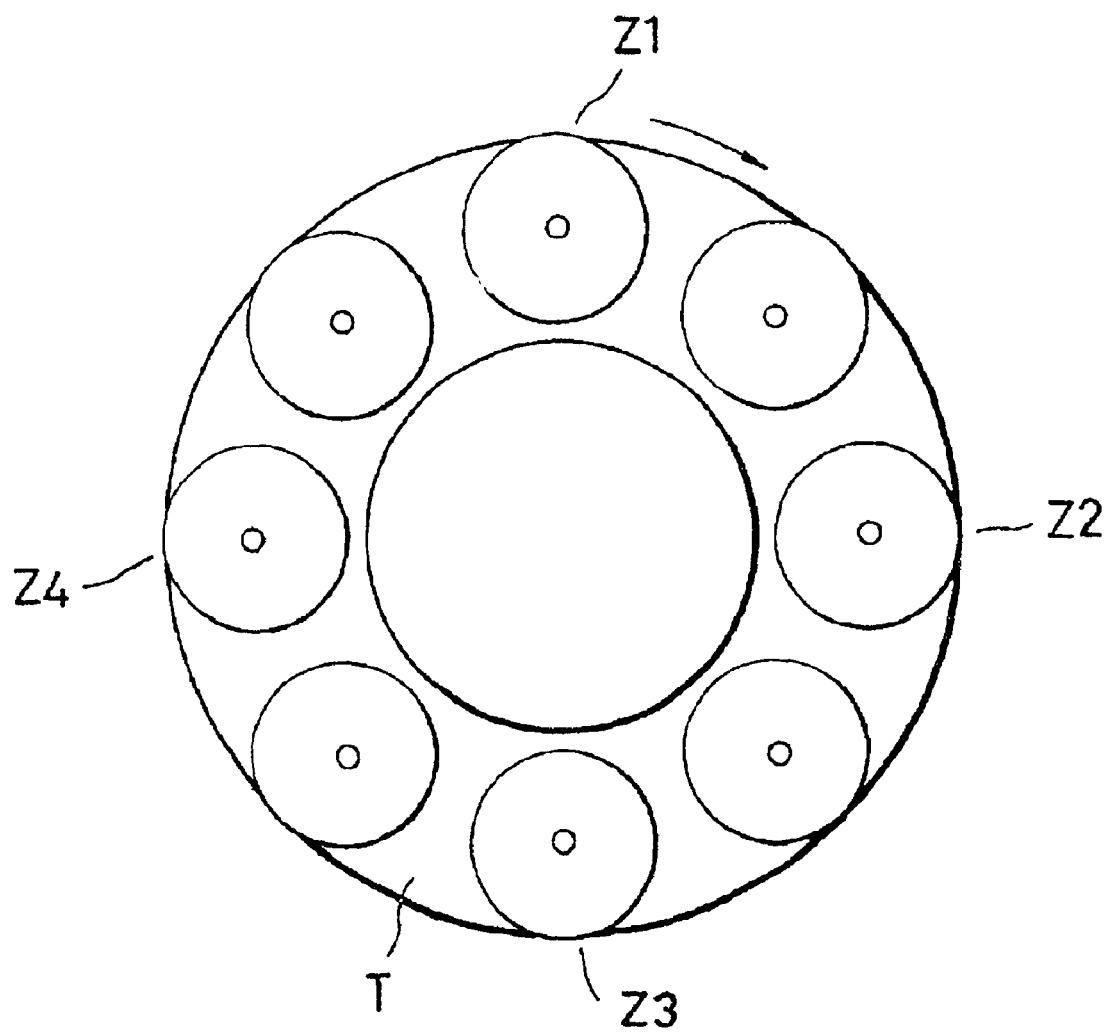
FIG. 6 is a view shows each of stations where the disc-shaped substrates are successively moved and placed.

In other word, a first station Z1 which is a station where the adhesive agent S2 is applied to the lower disc-shaped disc substrate, as explained hereinbefore, is then moved to a next station, that is, a second station Z2 (see FIG. 6).

Figure 7:
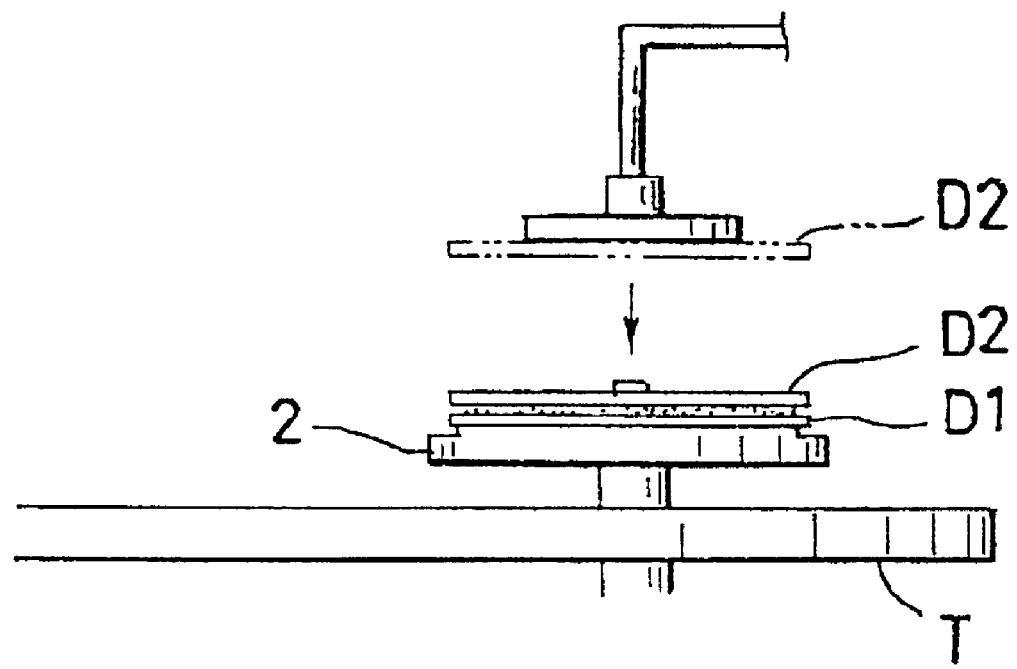
FIG. 7 is a view showing a condition under which the upper disc-shaped substrate sets above the lower disc-shaped substrate.

At the second station, another upper disc-shaped substrate D2 is superimposed on the lower disc-shaped substrate D1 with the adhesive S2 (see FIG. 7).

The both superimposed disc-shaped substrates in this manner is then moved to the third station Z3 (see FIG. 6).

Figure 8A:
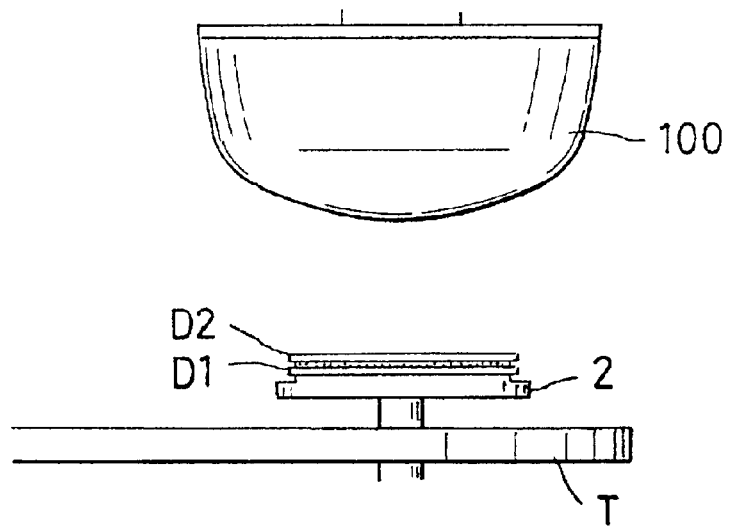
FIGS. 8(A) and 8(B) is a view showing a step where the upper disc-shaped-substrate against the lower disc-shaped substrate by means of the pressing body.
Figure 8B:
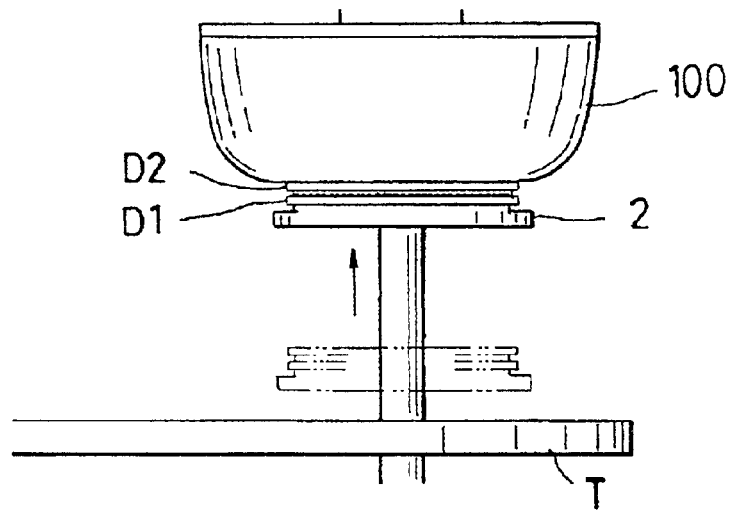

At the third station Z3, a pressing body 100 is pressed from above against the both disc-shaped substrates D1, D2 placed on the holding table. Although FIG. 8 shows the instance where the pressure plate 100 is pressed against both the disc-shaped substrates (namely, the upper disc-shaped substrate) contrary thereto, it is possible to lower the pressing body to have consequently pressurized both the disc-shaped substrates. The pressing body may be fabricated of flexible material in a hemispheric form and provides pressure force to allow the upper disc-shaped substrate D2 to pressure against the lower disc-shaped substrate.

Pressing action in this case results in that the pressing body is permitted to press against the disc-shaped substrates to so enlarge or magnify the contact portion from the center side to the outside as to function to squeeze air bubbles between both the disc-shaped substrates outwardly.

As a consequence of the aforementioned, the two disc-shaped substrates D1, D2, for the time being, are bonded to each other.

Both the disc-shaped substrates D1, D2 as laminated to each other are moved to a fourth station Z4 (see FIG. 6).

At the station Z4, both the disc-shaped substrates set on the holding table are so covered by an outer wall member as to enter into a pressure container with a closed air space.

Figure 9:
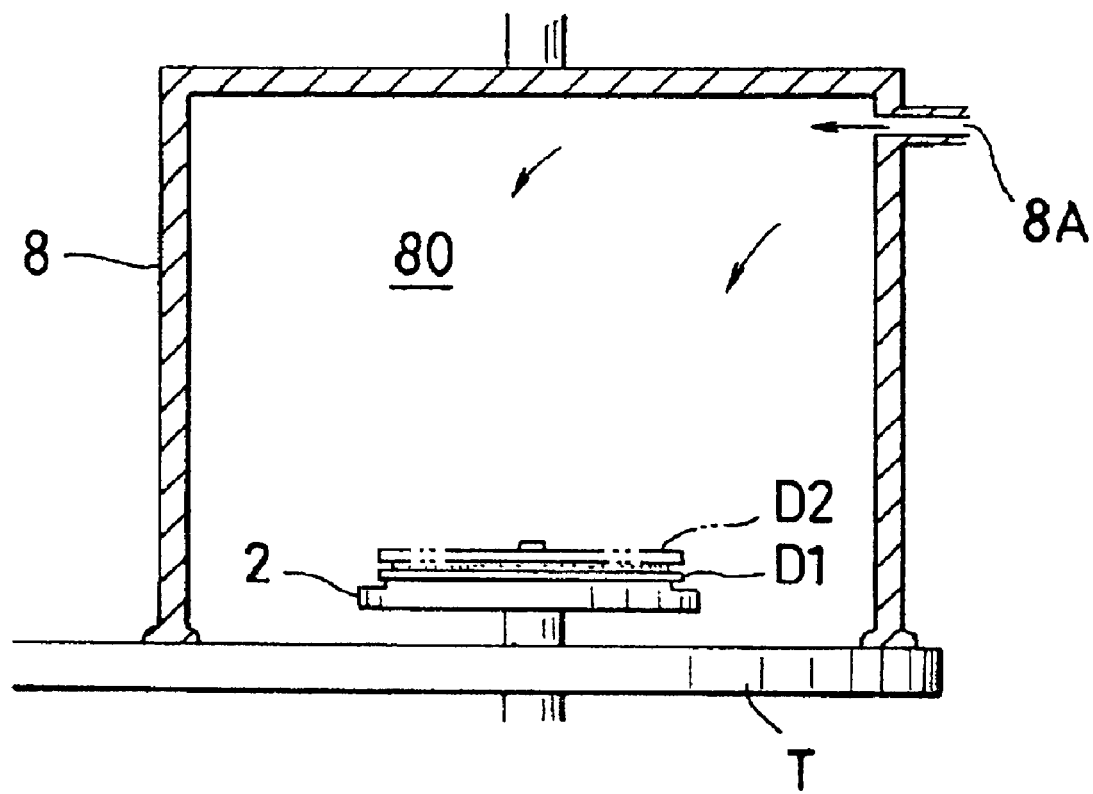
FIG. 9 is a schematic view showing the substrates exposed to or subject to a high-pressure atmosphere provided by means a high-pressure container.

For reference, the pressure container is so fabricated as to make its space possible close or open to the open air. Further particular may be omitted. FIG. 9 is a schematic view for use to explain a high-pressure atmospheric condition (pressurized condition) provided by use of a high-pressure container.

As shown, a condensed air is fed through a flow route pipe 8 space 80 closed by the outer wall member of the high-pressure container to thereby afford the predetermined high-pressure. The pressure of the high-pressure atmosphere may be freely adjusted. In this instance, after both the disc-shaped substrates D1, D are entered within the high-pressure container 8, a pressure is increased in the space 80 therein as sealed and so conditioned to obtain the high-pressure atmosphere as set.

Air bubbles (most of them are present in the adhesive agent) are between the two disc-shaped substrates D1, D2 left to the high-pressure atmosphere are reduced in size to minimize them to a great extent or mostly disappeared.

In another word, if air bubbles are between the two disc-shaped substrates D1, D2, a certain pressure is exerted to both the two disc-shaped substrates to thus decrease the volume of the air bubbles from V1⇒V2.

Figure 10:
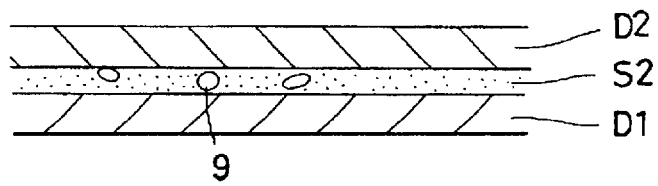
FIG. 10A is a representation of air bubbles present between the both disc-shaped between before having the container high-pressure atmospheric.
FIG. 10B is a representation of air bubbles present between the both disc-shaped between after having the container high-pressure atmospheric.
Figure 10:
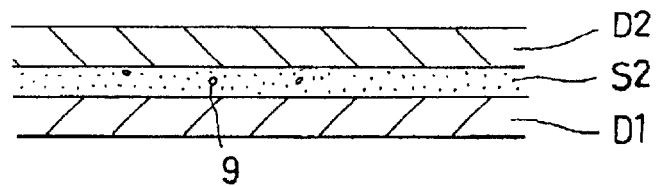

FIG. 10 illustrates the aforementioned principle in a typical form. Among others, FIG. 10A shows a condition under which both the disc-shaped substrates D1, D2 seal the air bubbles 9 before they are left to the inside of the high-pressure atmosphere.

These air bubbles 9 are what are sealed in the atmosphere and each of the air bubbles is held stable since the pressure in the air bubble is 1 atmosphere as the same as the atmosphere to be well balanced.

Notwithstanding, the preceding step where the upper disc-shaped substrate is pressed against the lower disc-shaped substrate if showing more than 1 atmosphere, it is considered to be well balanced with the pressure in the bubble.

On the other hand, FIG. 10B shows a condition under which both the disc-shaped substrates are left within the high-pressure atmosphere. At this moment, the volume each of the air bubbles is reduced to show Dimensions V1⇒V2 (V1>V2) thus well balanced where the adhesive agent S2 is firmly mounted to the disc-shaped substrates together.

In this instance, pressure of the high-pressure atmosphere should be more than the pressure applied to the both disc-shaped substrates D1, D2 before the instant step.

Both the disc-shaped substrates are exposed or subject to pressure greater than such pressure as applied to the step prior to the instant step to thereby decrease the air bubbles so that the adhesive agent is firmly secured to both the disc-shaped substrates after a lapse of a certain time. Both the disc-shaped substrates keep securable.

Since a period of time is longer required for leaving the discs to the high-pressure to firmly mount both the disc-shaped adhesive substrates together by the viscosity, for example, 10~20 seconds are preferable to this end, depending upon the adhesive agent.

In this step of leaving the substrates to the high-pressure atmosphere, pressure may be equally applied between both the disc-shaped substrates so that pressure may be also applied in the same manner as aforementioned to the air bubbles dispersedly contained in the adhesive agent there between.

Consequently, the air bubbles in both the whole disc-shaped substrates may be impartially and averagely to have them reduced.

Variation in each of the air bubbles is proportional to pressure applied between both the disc-shaped D1, D2 so that such pressure is enough to the extent that each of the air bubbles may be so sized as to provide the optical disc from the quality point of view.

For example, if dimension (normally, referring to the maximum length) of each of the air bubbles may be standardized as $50\mu$, the maximum dimension of each of a multiple of the air bubbles should be set to be less than $50\ \mu$.

Figure 12:
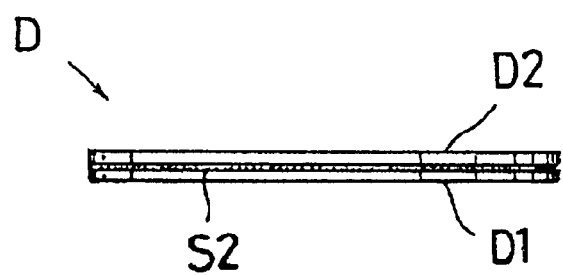
FIGS. 12(A) and 12(B) is a representation after laminated.
Figure 12:
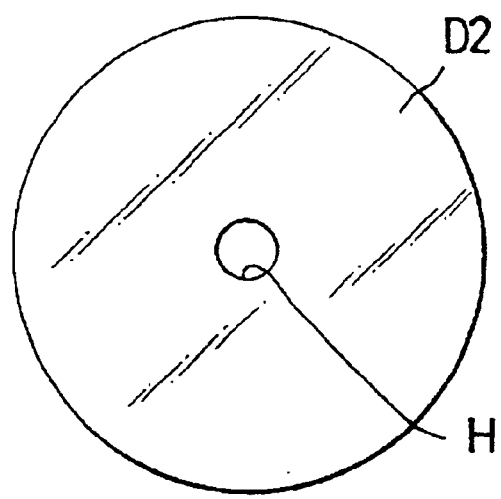

In this manner, both the disc-shaped substrates left to the inside of the high-pressure atmosphere for a certain time of period result in an optical disc D of a high quality, which minimize or eliminate the air bubbles, to the utmost, between the substrates (see FIG. 12).

It is understood that the air bubbles may be minimized or eliminated to the full extent by leaving the discs inside of the high-pressure atmosphere for a certain time of period. However, the pressure member is employed in advance to press the upper disc-shaped substrate against the lower disc-shaped substrate to increase to improve the result prior to be the atmosphere as highly pressured.

Figure 13A:
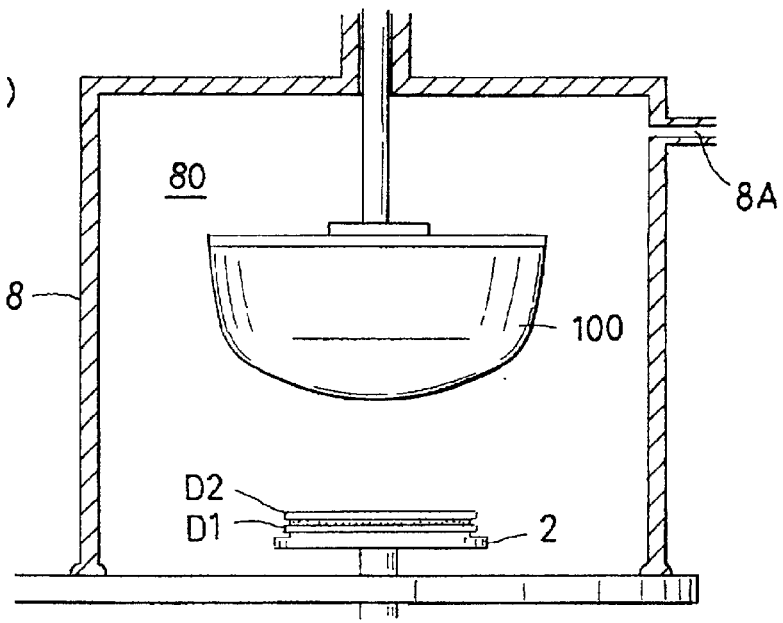
FIGS. 13(A) and 13(B) is a view showing relation between the pressing, body and the upper disc-shaped abstract before and after having the container high-pressure atmospheric.
Figure 13B:
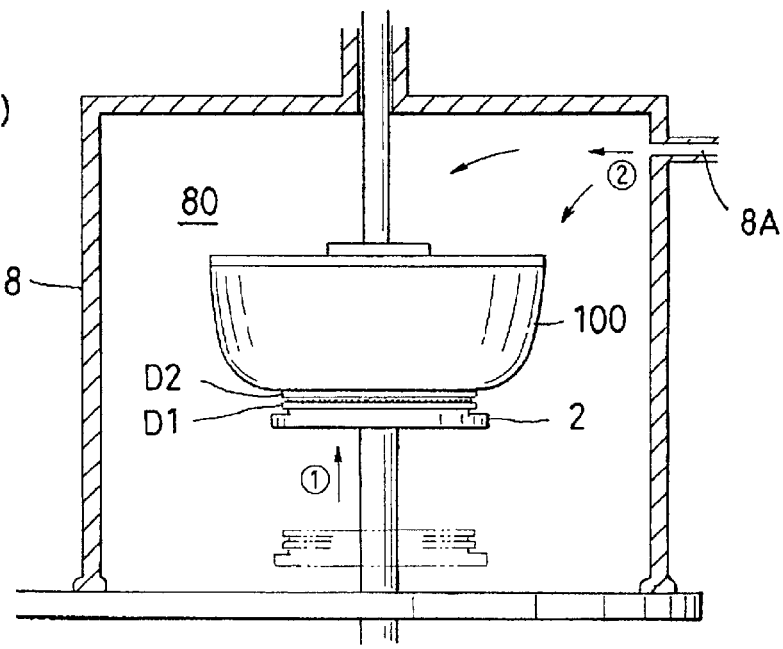

FIGS. 13A and 13B illustrate a step in which the upper disc-shaped substrate is beforehand pressed by the pressure member prior to leaving the same inside of the high-pressure atmosphere.

In this instance, FIG. 13A shows the condition of the high-pressure container before having it high pressurized. FIG. 13B shows the condition under which the upper disc-shaped substrate is pressed by the press member. For information, this is the case where pressure action is performed by upward movement of the holding table.

Thereafter, a technique is employed to leave the substrates inside when the space 80 is left in the high-pressure atmosphere (①⇒②).

Incidentally, it is possible the holding table is machined and the press member is then non-contact condition to have high-pressurized.

The press member used herein may be flexible and substantially hemispheric form as shown.

In this case, the press member may be pressed against the disc-shaped substrates to enlarge the contact portion from the central side to the outside to so act the air bubbles as to push out outwardly (radially).

Although the pressure force if used what is greater than pressure of the high-pressure atmosphere to more reduce volume of each air bubble, pressure derived from the flexible pressure member may more increase the central portion than the peripheral portion to bias pressure applied both the disc-shaped substrates.

For this reason, preferably, the pressure force which relies on the press member may not contribute to reduction in the air bubbles.

In this sense, it is desirable to have the pressure force less than pressure of the high-pressure atmosphere.

Although the present invention has been described hereinbefore, the invention is not limited to this embodiment. Various modifications may be made without departing from the substance of the invention.

For example, configuration of the press member employed in the invention is not necessarily limit to what is shown in the drawings may be possible to change its design.

Although the stations Z1, Z2, Z3, and Z4 are explained when they are in the same table, it is possible to apply pressure force other position than those on the turn table.

Especially, a space which produces the high-pressure atmosphere may preferably provide another position.

In addition, the steps in the stations Z2 and Z3 may be carried out in the same position.

According to the present invention, it is possible to manufacture the optical disc of high quality which is less mixture of the air bubbles between both the disc-shaped substrates as different from lamination of them by use of the conventional adhesive sheet member. Furthermore, each of the air bubbles may be reduced by simply performing reduction in the high-pressure atmosphere in the conventional step.

What is claimed is:

1. A method of laminating first and second disc-shaped substrates in order to form a disc product comprising the following steps;
   1) bonding an adhesive agent to a surface of the first disc-shaped substrate,
   2) placing the second disc-shaped substrate on the adhesive applied to the first disc-shaped substrate,
   3) pressing the first disc-shaped substrate against the second disc-shaped substrate by means of a pressing body by applying a first pressure level to join them and form a disc product, and
   4) exposing both the disk-shaped substrates joined as a disc product to a high-pressure atmosphere at a second pressure level greater than said first pressure level,
   said method further comprising:
      holding the pressing body against the second disc-shaped substrate in such a manner that a contact portion may be magnify enlarged from the center to the periphery, said holding step being conducted while said first and second disc-shaped substrates are held within the high-pressure atmosphere.

2. A method of laminating first and second disc-shaped substrates in order to form a disc product comprising the following steps;
   1) bonding an adhesive agent to a surface of the first disc-shaped substrate,
   2) placing the second disc-shaped substrate on the adhesive applied to the first disc-shaped substrate,
   3) pressing the first disc-shaped substrate against the second disc-shaped substrate by means of a pressing body by applying a first pressure level to join them and form a disc product, and
   4) exposing both the disk-shaped substrates joined as a disc product to a high-pressure atmosphere at a second pressure level greater than said first pressure level,
   said method further comprising:
      applying a first hold down pressure in a step of bonding the adhesive agent to the surface of the lower disc-shaped substrate, and
      applying a second hold down pressure in a step of pressurizing the second disc-shaped substrate against the first disc-shaped substrate by means of the pressing body in the high pressure atmosphere, thereby supplementing the pressure of the high-pressure atmosphere.

3. A method of laminating disc-shaped substrates according to claim 2 wherein said exposing step results in a disc product wherein the maximum dimension of each of a multiple of air bubbles is less than 50 micron.

4. A method of laminating first and second disc-shaped substrates in order to form a disc product comprising the following steps;
   1) bonding an adhesive agent to a surface of the first disc-shaped substrate,
   2) placing the second disc-shaped substrate on the adhesive applied to the first disc-shaped substrate,
   3) pressing the first disc-shaped substrate against the second disc-shaped substrate by means, of a pressing body by applying a first pressure level to join them and form a disc product, and
   4) exposing both the disk-shaped substrates joined as a disc product to a high-pressure atmosphere at a second pressure level greater than said first pressure level,
   said method further comprising:
      performing said pressing step and said exposing step at a single one of a plurality of processing locations.

5. A method of laminating disc-shaped substrates according to claim 4 wherein said plurality of stations are on a turntable and said method further comprises moving said disc shaped substrates to plural stations in a predetermined sequence.

* * * * *